Sept. 14, 1954             G. NATTA             2,689,250
PRODUCTION OF FURFURAL AND ACETIC ACID
FROM PENTOSAN CONTAINING MATERIAL
Filed April 26, 1951
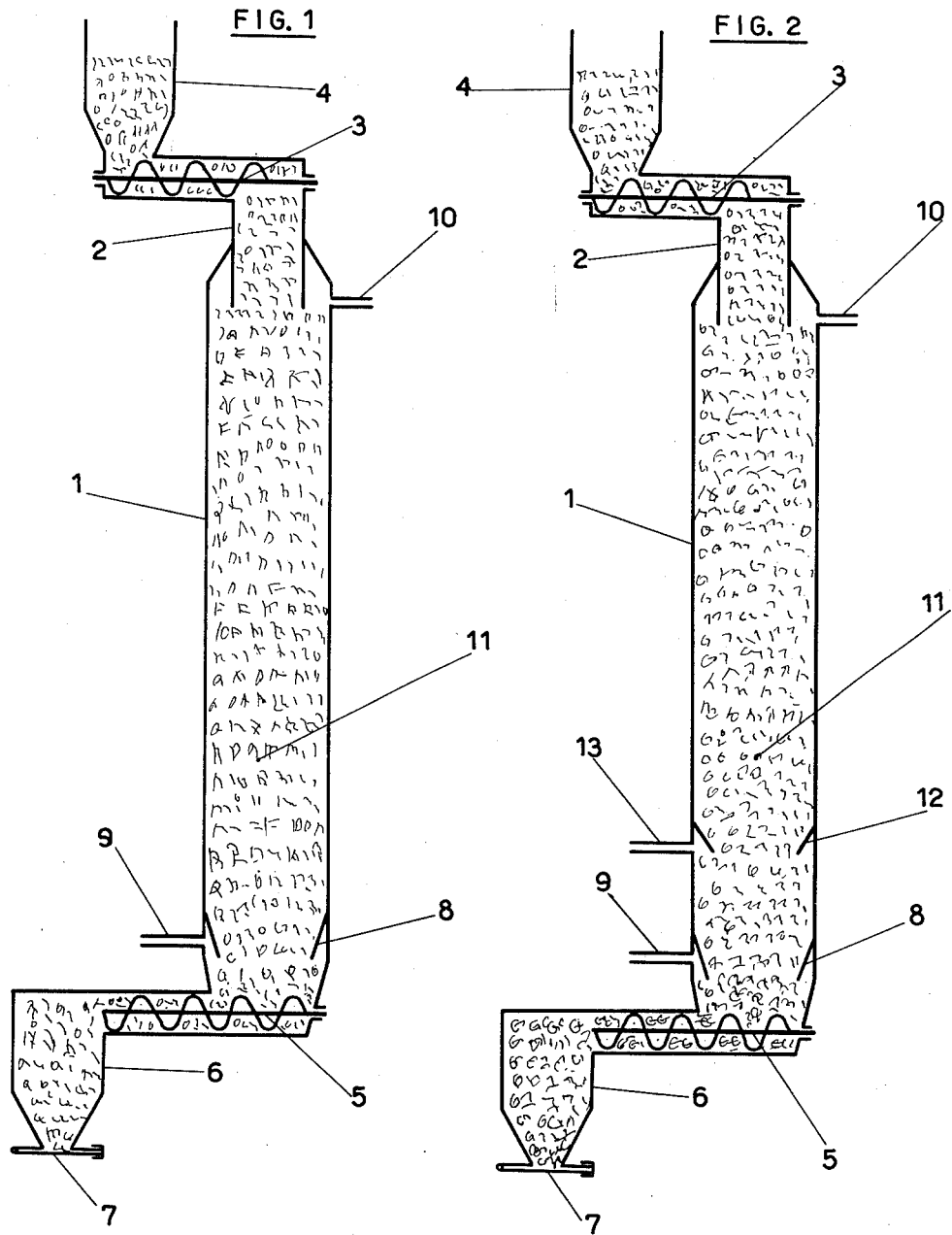
Giulio Natta
Inventor.
By
Shenderoth, Lind & Ponack
Attorneys.

Patented Sept. 14, 1954

2,689,250

UNITED STATES PATENT OFFICE 2,689,250

PRODUCTION OF FURFURAL AND ACETIC ACID FROM PENTOSAN CONTAINING MATERIAL

Giulio Natta, Milan, Italy, assignor to Oronzio De Nora Impianti Elettrochimici, Milan, Italy, a corporation of Italy Application April 26, 1951, Serial No. 223,032

4 Claims. (Cl. 260—347.9)

1

It is known to produce furfural and acetic acid from pentosan containing material such as oat hulls, shells of sunflower seeds, rice hulls, corncobs and the like, by heating a dampened mass of said material admixed with a furfural forming acid catalyst, such as sulphuric acid, by means of a current of steam, whereby the volatile reaction products, including furfural, are carried along with the current of steam issuing from the reaction vessel.

It is an object of the present invention to provide a process wherein the consumption of catalyst is greatly reduced, the reaction taking place in the presence of the catalyst in a concentration which is substantially greater than the concentration of the catalyst as it is introduced into the mass of the starting material, and the major part of the catalyst being recovered and recycled.

Another object of my invention is to provide a process in which the vegetable material exhausted is discharged from the reaction vessel free from any content of the acid catalyst and free from moisture, whereby it can be still utilized, for instance, as a fuel, with no danger to the furnace in which it is burnt, for producing the steam required for carrying out the process itself.

A further object of the present invention is to provide a yield of furfural which is higher than that obtained with the known processes, and which is close to its theoretical value.

According to my invention, I feed continuously the pentosan containing material in a column, together with an amount of water and I introduce also continuously a comparatively small quantity of hydrochloric acid therein; at the bottom of the column I introduce a flow of superheated steam and I withdraw the gaseous products from near the top of the column. The upward flow of steam through the column causes the acid to evaporate from the bottom layers of the mixture so that the colder superior layers receive this acid, which is partially condensed and added to the acid already existing therein.

In that zone of the column, therefore, a concentration of the hydrochloric acid takes place by rectification of the acid solution descending together with the vegetable material and the acid vapors flowing up inside the column therethrough.

In the intermediate zone of the column the reaction takes place in the presence of the concentrated acid solution, while the exhausted material at the very bottom of the column is discharged free from acid as well as free from moisture.

The present application is a continuation in part of the applications Ser. No. 720,476, filed January 6, 1947, now abandoned and Ser. No. 766,889, filed August 6, 1947, now abandoned.

The accompanying drawings show some forms of equipment for carrying out my invention, which will be better understood from the following description in connection therewith.

In the drawings:

Fig. 1 is a diagrammatic sectional view of one apparatus;

Fig. 2 is a similar view of another apparatus.

With reference to Fig. 1, the apparatus consists of a column 1, into which a conduit 2 penetrates at the top; the conduit 2 communicates with an endless screw conveyor 3 fed by a hopper 4.

The column 1 is made of acid resisting material, or else of copper or other metal, provided that the mantle is steam-jacketed or otherwise heated, so as to prevent condensation of the acid vapors on its inner surface.

The bottom end of the column 1 communicates with a second conveyor 5 discharging into an outlet hopper 6 provided with closing means 7. A frusto-conical deflector 8 is provided just above the conveyor 5 and a pipe 9 enters the column behind said deflector; another pipe 10 is connected to the column in correspondence to the top portion behind the end of the conduit 2.

A mixture consisting of comminuted vegetable material, containing pentosan, such as corncobs or rice hulls, 15 per cent water and 3 per cent hydrochloric acid, is introduced into the hopper 4, wherefrom the conveyor 3 feeds it into the column 1; 200 per cent by weight of steam, superheated at 300° C. is introduced into the column 1 through the pipe 9. The steam causes both the water and hydrochloric acid in the zone immediately above the deflector 8 to distil towards the superior layers, which get enriched, therefore, with acid content; the latter may be, for instance, as high as 6–12 per cent by weight with respect to the vegetable material in the zone indicated by 11 in the drawing. In this zone, the reaction takes place and furfural is formed from the pentosans contained in the vegetable material.

From the pipe 10 a gaseous flow issues consisting of 215 per cent steam, 2.5 per cent hydrochloric acid and either 13–16 per cent or 7–9 per cent furfural, according to whether corncobs or rice hull has been employed as starting material, said figures being taken with respect to the weight of the vegetable material which is being passed continuously through the column 1. A small portion of the hydrochloric acid, that is about 0.5 per cent, is combined with the exhaust material in the form of chlorides.

The remaining major part of hydrochloric acid issuing through the pipe 10 is recovered by any suitable means, so as to be partially employed again in the cycle.

The furfural and the acetic acid are separated from the condensed water and collected also according to the known art.

The exhausted material is discharged by the conveyor 5 through the bottom hopper 6 either continuously or at short intervals, at such a rate that the material takes a time of 3 to 8 hours for passing through the column from top to bottom; the material discharged from 6 is practically free from hydrochloric acid and is practically dried, due to the high temperature of the superheated steam introduced into the column 1 through the pipe 9 and can be utilized for producing the steam in any suitable boiler; the production of steam, therefore, involves no expense in this process and consequently the cost of the furfural and acetic acid produced is exceedingly low, in comparison to the known methods of producing them.

According to the manner of carrying out my invention represented in Fig. 2, the apparatus is quite similar to that shown in Fig. 1, but is provided with a further inner deflector 12 and a further pipe 13 in correspondence thereto.

From the top of the apparatus only the vegetable material admixed with, say 15 per cent water is introduced, while a flow of 2 to 3 per cent by weight of gaseous hydrochloric acid is introduced into the column through the pipe 13.

Owing to the introduction of steaim through the pipe 9, a zone of maximum concentration of acid with respect to the material forms at 11 due to the same reasons set forth in connection to Fig. 1 and the furfural produced (yield 8 to 16 per cent by weight relative to the starting material according to the nature of the latter) flows out together with the steam and the hydrochloric acid through the pipe 10.

Also in this case the exhausted vegetable material is dry and free from acids and the process proceeds continuously.

The amounts of water, hydrochloric acid and steam as well as the temperatures mentioned in the above example may undergo considerable variation according to how the reaction is conducted; the total amount, with respect to the vegetable material, of the water including the moisture contained in the material itself, can vary within a range of 15 to 30 per cent; the total hydrochloric acid introduced must be at least 1.5 per cent for a sufficiently active reaction and can be as high as 6 per cent, but in general an amount of 2 to 3.5 per cent is considered to be satisfactory.

The hydrochloric acid may be introduced either as wholly contained in the acid solution admixed with the starting material, or wholly in the gaseous form through the pipe 13, or else partially as a solution from the top of the column and partially from the bottom in the gaseous form through the pipe 13. The amount and temperature of the superheated steam largely depends upon the quantity of water introduced in the column and the moisture contained in the starting material; the greater is the quantity of the steam, the lower can be its temperature, so that the total heat introduced in the column be sufficient to evaporate all of the water contained in the mixture and to carry out the hydrochloric acid and the furfural in the gaseous form.

In general, the quantity of steam may be comprised between 180 and 400 per cent and its temperature may correspondingly vary between 350° and 200° C.

The amount of hydrochloric acid and steam, however, can be still reduced, according to another manner of carrying out my invention, if gaseous chlorine is admixed with the steam introduced in the column through the pipe 9, or anyhow introduced into the column near the bottom thereof, about the same level where the steam is introduced.

For instance, a quantity of chlorine corresponding to 2-3 per cent relative to the weight of the vegetable material is admixed with a quantity corresponding to 200 per cent of steam superheated to 280° C. and these two gaseous fluids are introduced through the pipe 9 into the column 1 which is charged with the vegetable material, for instance rice hulls, soaked with a 10 per cent solution of hydrochloric acid; the quantity of this solution may be 10 per cent by weight of the vegetable material.

I am aware that the use of gaseous chlorine as a catalyst for producing furfural from pentosan containing material has already been proposed in the Patent 2,488,981.

Such process requires a comparatively low consumption of steam in comparison with other known processes, but with certain materials, such as for instance rice hulls, the yield is relatively poor.

According to the last mentioned manner of carrying out my invention, however, the yield is much greater. Moreover, under the action of the hydrochloric acid solution, the pentosans undergo a preliminary hydrolysis to pentoses and the successive hydrolysis to furfural is enhanced in the middle zone of the column where the concentration of hydrochloric acid is increased due to the action of the chlorine and the effect of rectification caused by the acid material descending through the column; should the hydrochloric acid solution not be present in admixture with the starting material, the pentosans do not undergo a preliminary hydrolysis and the yields are lower due to the oxidizing action of the chlorine which is still present in the bottom zone of the column.

On the other hand the addition of chlorine to the steam reduces the consumption of the latter for a given superheating temperature, because the reaction with chlorine is highly exothermic.

The vapors issuing from the pipe 10 are practically free from chlorine; they can be first partially condensed so as to obtain a solution of hydrochloric acid which can be utilized for impregnating the starting material in the continuous process. By completing the condensation of said vapors an acid solution containing acetic acid, hydrochloric acid and furfural is obtained, in which the furfural content is about 4-5 per cent, corresponding to the yield of about 8-9 per cent relative to the weight of the vegetable material treated, if the latter is rice hulls. If corncobs are treated, the above figures are 5-7 per cent and 13-15 per cent respectively.

If the starting rice hulls are impregnated with 15 per cent of the aforementioned solution of hydrochloric acid (10 per cent of acid relative to the water) and 250 per cent of steam at 280° C. together with 2 per cent chlorine are introduced through the pipe 9, the yield of furfural is about 9–10 per cent relative to the weight of the rice hulls treated.

If corncobs are treated in the same last mentioned condition the yield of furfural is about 14–16 per cent relative to the weight of the dry corncobs introduced.

Having now particularly described and ascertained the nature of my said invention, and in what manner the same is to be performed, I declare that what I claim is:

1. A process for producing furfural and acetic acid from pentosan containing material, which comprises continuously feeding unheated pentosan containing material together with water into the top of a column having a top, a bottom and an intermediate zone, whereby they descend through said column to the bottom thereof, introducing hydrochloric acid into said column at a point above the bottom thereof, vaporizing the water and hydrochloric acid contained in said material at the bottom of the column by means of superheated steam introduced into the column at the bottom thereof, thereby producing in the liquid phase of the material descending through the column at a point above that at which vaporization of the water and hydrochloric acid takes place a rectifying effect by the passage of the acid vapors through said descending material, said rectifying effect being due to the partial condensation of the hydrochloric acid vapors by the water contained in the cold material entering at the top of the column and to the fact that the descending material always has a lower temperature than the ascending vapors, whereby the acid concentration in the liquid phase increases relative to its concentration at the point of introduction of said acid and reaches a maximum at a point intermediate the top and bottom of the column, said point of maximum concentration constituting a zone of maximum hydrolysis of said pentosan containing material, withdrawing the resultant gaseous products containing furfural and acetic acid from the top of said column, and continuously discharging the exhousted material, dried and free from acid, from the bottom of said column.

2. The method of producing furfural in a single continuous process which comprises introducing furfural yielding plant material containing water, and hydrochloric acid as a catalyst, into the top of a distillation column, introducing super-heated steam in the bottom of said column, and regulating the flow of the furfural yielding material and catalyst and the volume and temperature of the steam so as to maintain a low catalyst concentration in the top of the column to promote conversion of the pentosan content of the furfural yielding material to pentose and so as to vaporize and recondense a portion of the catalyst in the mid-portion of the column to cause an increase in catalyst concentration to promote conversion of the pentose to furfural, discharging the furfural, steam and vaporized products adjacent the top of the column below the inlet for the furfural containing material, and discharging the dry spent plant material substantially free from catalyst and water from the bottom of the column and below the steam inlet thereto.

3. The method of producing furfural which comprises continuously introducing moist furfural yielding plant material and an aqueous solution of hydrochloric acid into the top of a distilling column, introducing a hydrochloric acid producing catalyst into said column above the bottom thereof, continuously introducing superheated steam into the bottom of said column at a temperature and in sufficient volume to remove the furfural and other volatile reaction products from the top of said column, continuously contacting the steam moving upwardly in said column with descending moist furfural yielding plant material containing hydrochloric acid to condense a portion of said steam and increase the catalyst concentration in the condensation zone, continuously removing the uncondensed steam, furfural, vaporized catalyst and other volatilized reaction products from the top of said column, and continuously removing the spent furfural yielding plant material from the bottom of the column below the steam inlet.

4. The method of producing furfural which comprises introducing unheated moist furfural yielding plant material into the top of a distilling column having a top, bottom and intermediate section, introducing a hydrogen chloride containing catalyst into said furfural yielding plant material in said distilling column, continuously introducing super-heated steam into the bottom of said column at a temperature and in sufficient volume to distil the furfural, water and other volatile reaction products from said furfural yielding plant material, passing the volatilized products into contact with the colder upper layers of said furfural yielding plant material to condense and return a portion of said catalyst and other volatilized material into the mid-portion of the column, continuously removing uncondensed steam, furfural, vaporized catalyst and other volatilized reaction products from the top of said column, and continuously removing the spent furfural yielding plant material from the bottom of said column below the steam inlet.

References Cited in the file of this patent

UNITED STATES PATENTS

| Number | Name | Date |
|---|---|---|
| 1,322,054 | Ricard | Nov. 18, 1919 |
| 2,140,572 | Brownlee | Dec. 20, 1938 |
| 2,362,390 | Millar | Nov. 7, 1944 |
| 2,369,655 | Boehm | Feb. 20, 1945 |
| 2,488,981 | Marchiaro | Nov. 22, 1949 |